United States Patent
Wong et al.

(10) Patent No.: US 8,910,250 B2
(45) Date of Patent: Dec. 9, 2014

(54) USER NOTIFICATIONS DURING COMPUTING NETWORK ACCESS

(71) Applicant: Cisco Technology, Inc., San Jose, CA (US)

(72) Inventors: Pok Sze Wong, San Jose, CA (US); Paul Forbes Bigbee, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 14 days.

(21) Appl. No.: 13/748,893

(22) Filed: Jan. 24, 2013

(65) Prior Publication Data

US 2014/0208388 A1    Jul. 24, 2014

(51) Int. Cl.
*H04L 29/06*    (2006.01)

(52) U.S. Cl.
CPC .............. *H04L 63/105* (2013.01); *H04L 63/08* (2013.01); *H04L 63/10* (2013.01); *H04L 63/02* (2013.01)
USPC .................... 726/4; 726/11; 726/13; 713/182

(58) Field of Classification Search
CPC ....... H04L 63/08; H04L 63/10; H04L 63/101; H04L 63/02; H04L 29/06557; G06F 11/0709
USPC ................................................. 726/4, 11–14
See application file for complete search history.

(56) References Cited

U.S. PATENT DOCUMENTS

| | | | | |
|---|---|---|---|---|
| 6,557,122 B1 * | 4/2003 | Sugauchi et al. | | 714/57 |
| 7,463,652 B2 * | 12/2008 | Karol et al. | | 370/476 |
| 8,126,428 B2 * | 2/2012 | Gelbman et al. | | 455/406 |
| 8,271,974 B2 * | 9/2012 | Mazhar et al. | | 717/177 |
| 8,327,432 B2 | 12/2012 | Wong et al. | | |
| 8,381,268 B2 * | 2/2013 | Winget et al. | | 726/4 |
| 2005/0228984 A1 * | 10/2005 | Edery et al. | | 713/153 |
| 2008/0209537 A1 | 8/2008 | Wong et al. | | |
| 2008/0295157 A1 | 11/2008 | Wong et al. | | |
| 2009/0067440 A1 * | 3/2009 | Chadda et al. | | 370/401 |
| 2012/0101952 A1 * | 4/2012 | Raleigh et al. | | 705/304 |

OTHER PUBLICATIONS

Cisco, "Configuring Cisco Security Group Access Policies," Cisco Identity Services Engine User Guide, Release 1.0, Chapter 21, 2011, pp. 1-20.

* cited by examiner

*Primary Examiner* — Tae Kim
*Assistant Examiner* — Louis Teng
(74) *Attorney, Agent, or Firm* — Edell, Shapiro & Finnan, LLC

(57) ABSTRACT

A notification is received that a network device in a computing network has blocked a service request directed towards a network resource of the computing network. A determination is made, based on authentication information associated with one or more of a network endpoint that transmitted the service request and a user at the network endpoint, as to whether the user should be notified of a reason that the network device blocked the service request. If it is determined that the user should be notified, a notification summarizing the reason that the network device blocked the service request is transmitted to the network endpoint.

21 Claims, 8 Drawing Sheets

| SGACL | | | |
|---|---|---|---|
| SOURCE | LOCATION | DESTINATION | ACCESS |
| EMPLOYEE | ENTERPRISE PREMISES | CUSTOMER DATA | ALLOW |
| EMPLOYEE | ENTERPRISE PREMISES | APPLICATION A | ALLOW |
| EMPLOYEE | ENTERPRISE PREMISES | APPLICATION B | ALLOW |
| EMPLOYEE | OFF PREMISES | CUSTOMER DATA | DENY |
| EMPLOYEE | OFF PREMISES | APPLICATION A | ALLOW |
| EMPLOYEE | OFF PREMISES | APPLICATION B | DENY |
| GUEST | ENTERPRISE PREMISES | CUSTOMER DATA | DENY |
| GUEST | ENTERPRISE PREMISES | APPLICATION A | ALLOW |
| GUEST | ENTERPRISE PREMISES | APPLICATION B | ALLOW |
| OTHERS | ANYWHERE | CUSTOMER DATA | DENY |
| OTHERS | ANYWHERE | APPLICATION A | DENY |
| OTHERS | ANYWHERE | APPLICATION B | DENY |

FIG.2

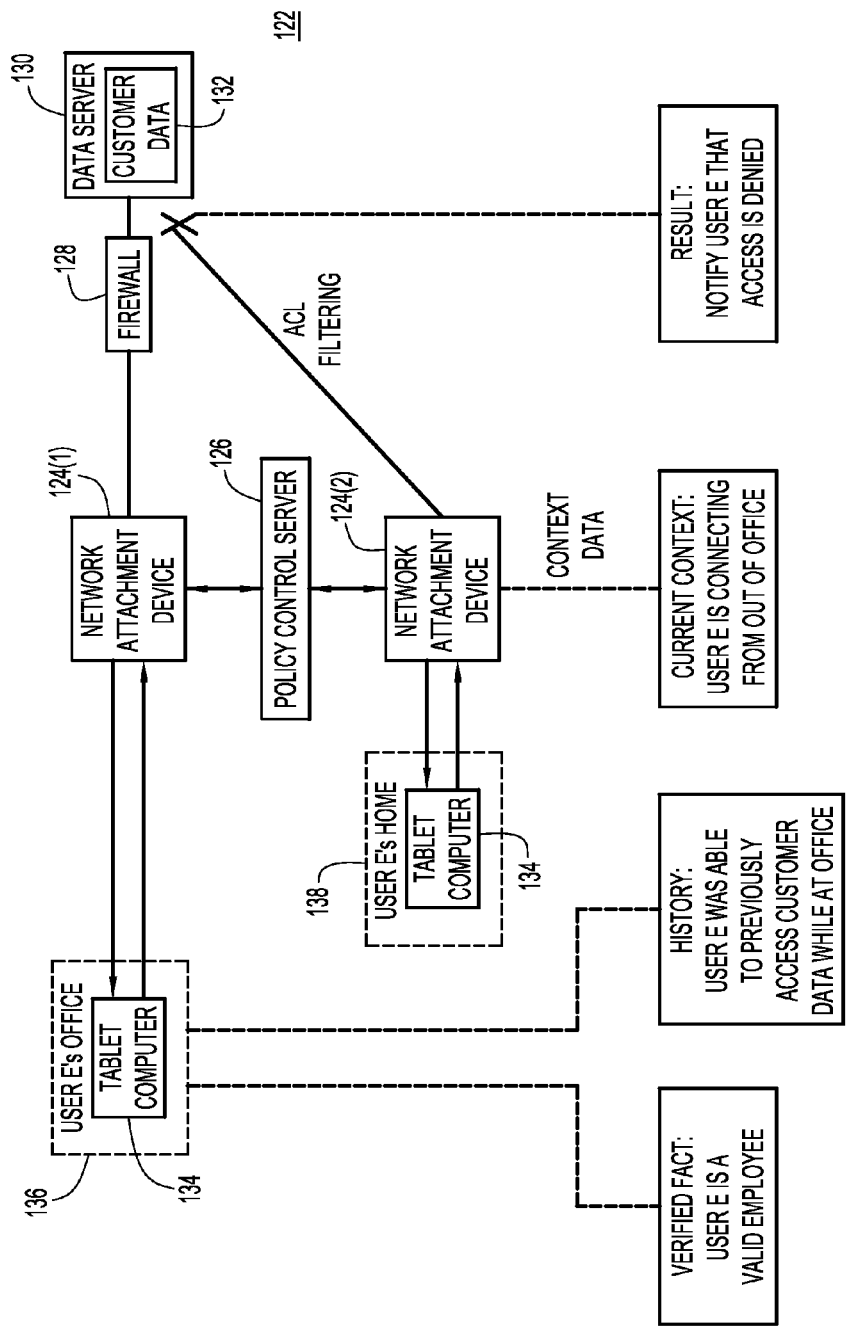

USER NOTIFICATIONS DURING COMPUTING NETWORK ACCESS

TECHNICAL FIELD

The present disclosure relates to accessing a computing network.

BACKGROUND

Enterprise computing networks are networks built by enterprises (e.g., businesses, universities, etc.) that enable users to share computing resources. Users within the enterprise premises (e.g., buildings, offices, production sites, etc.) locally access the network via endpoints/terminals (e.g., computers, mobile devices, etc.) that are connected to the network through a network attachment device within the premises. Often, an enterprise computing network is configured to interconnect multiple premises so that users at different locations can share computing resources.

Many enterprise computing networks are now configured to allow users to remotely access the network. During remote network access, the users access the network through endpoints that are located at remote sites outside the enterprise premises. Remote sites may include, for example, a user's home or a public location that has Internet connectivity.

BRIEF DESCRIPTION OF THE DRAWINGS

FIG. 2 is a table illustrating access controls in accordance with examples presented herein.

FIGS. 3A-3C are schematic diagrams illustrating a return policy decision in an enterprise computing network in accordance with examples presented herein.

DESCRIPTION OF EXAMPLE EMBODIMENTS

Overview

A notification is received that a network device in a computing network has blocked a service request directed towards a network resource of the computing network. A determination is made, based on authentication information associated with one or more of a network endpoint that transmitted the service request and a user at the network endpoint, as to whether the user should be notified of a reason that the network device blocked the service request. If it is determined that the user should be notified, a notification summarizing the reason that the network device blocked the service request is transmitted to the network endpoint.

Example Embodiments

Presented herein are techniques to improve the user experience for access to a computing network. In particular, techniques are provided to back trace and convey to the end user the drop reason based on user policy and historical context of the user.

Figure 1:
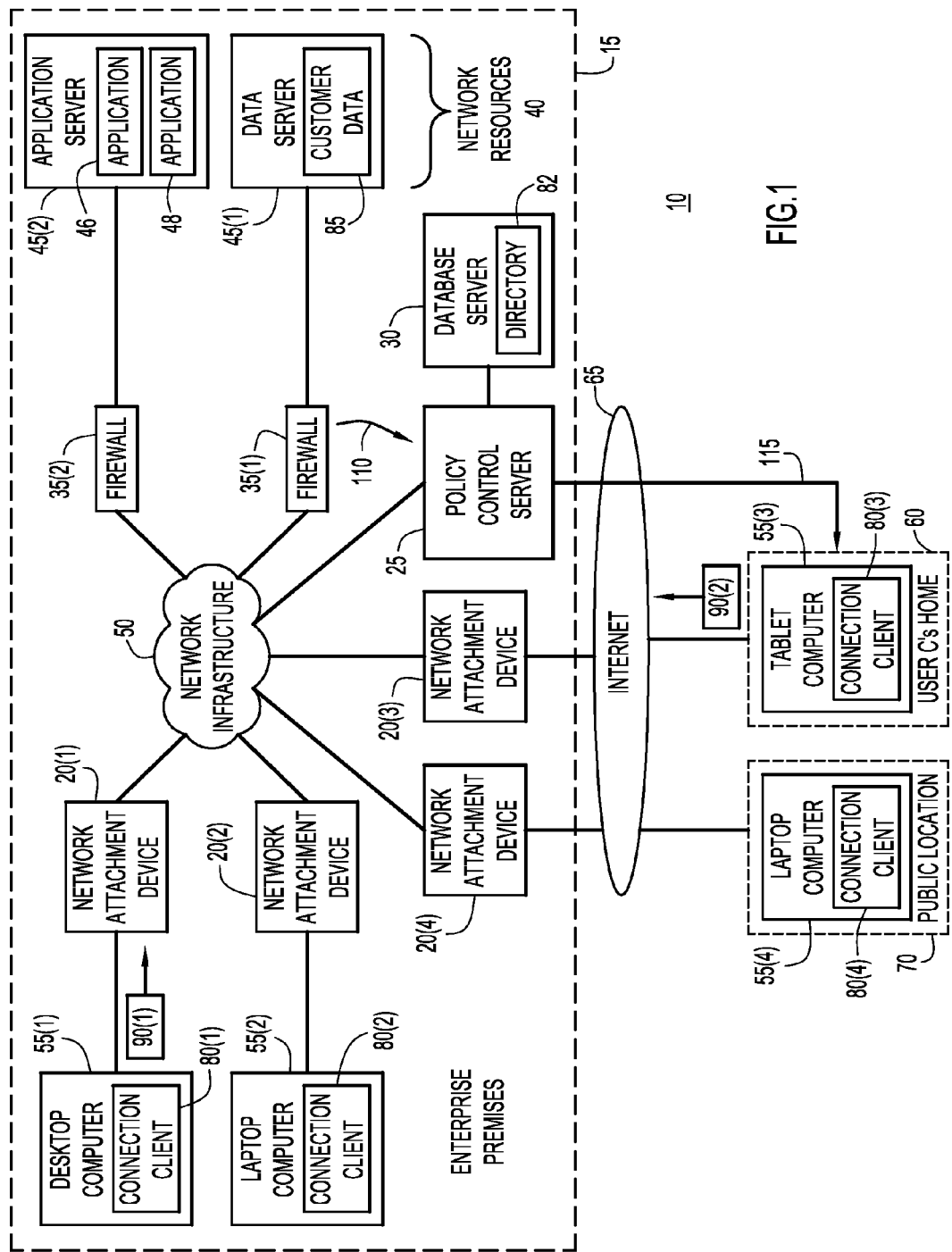
FIG. 1 is a block diagram of an enterprise computing network in accordance with examples presented herein.

FIG. 1 is a block diagram of an enterprise computing network 10 in accordance with examples presented herein. In this example, an enterprise maintains physical premises 15 that may comprise one or more buildings, offices, production sites, etc. Within the premises 15 are a plurality of network attachment devices 20(1)-20(4), a policy control server 25, a database server 30, firewalls 35(1) and 35(2), and network resources 40. In this example, the network resources 40 comprise a data server 45(1) and an applications server 45(2). Premises 15 also comprises a network infrastructure 50 (e.g., wires, cables, etc.) which facilitates communication between the computing devices within the premises.

Enterprise computing network 10 may be, for example, a local area network (LAN), a wide area network (WAN), etc. Network attachment devices 20(1)-20(4) are devices configured to enable users at network endpoints/terminals 55(1)-55(4) to connect to the infrastructure 50 and access the network resources 40. The network attachment devices 20(1)-20(4) may comprise, for example, switches, routers, gateways (e.g., Virtual Private Network (VPN) gateways), etc. In the example of FIG. 1, there are four network endpoints 55(1), 55(2), 55(3), and 55(4) and four associated network attachment devices 20(1), 20(2), 20(3), and 20(4). That is, each of the network endpoints 55(1), 55(2), 55(3), and 55(4) is associated with, and connects through, a corresponding one of the network attachment devices 20(1), 20(2), 20(3), and 20(4). In one example, network endpoint 55(1) is a desktop computer, network endpoint 55(2) is a laptop computer, network endpoint 55(3) is a tablet computer, and network endpoint 55(4) is laptop computer. Desktop computer 55(1) and laptop computer 55(2) are located within the premises 15, while tablet computer 55(3) and laptop computer 55(4) are located off premises (i.e., at a location outside of the enterprise premises 15).

In the example of FIG. 1, desktop computer 55(1) is located in the office of a first user (user A) who is an enterprise employee. When in his/her office, user A logs into the desktop computer 55(1) for access to the computing network 10. Laptop computer 55(2) is associated with a second user (user B) who is a guest of the enterprise (e.g., visiting customer, temporary employee, etc.). When in the enterprise, user B logs into the laptop computer 55(2) for access to the computing network 10.

Enterprise computing network 10 is configured to enable certain users to access the network from a remote location. As such, a third user (user C) is an employee that remotely accesses computing network 10 via tablet computer 55(3) while user C is at his/her home 60. The tablet computer 55(3) communicates with network attachment device 20(3) via the Internet 65. Finally, laptop computer 55(4) is associated with an unauthorized user or hacker (user D). The user D may be, for example, at a public location 70 and attempts to access the computing network 10 using the laptop computer 55(4). The laptop computer 55(4) communicates with network attachment device 20(4) via the Internet 65.

It is to be appreciated that the above arrangement of FIG. 1 is merely one example, and that other arrangements are possible (e.g., multiple network endpoints may be associated with a single network attachment device, additional or fewer network attachment devices or network endpoints may be present, etc.) Additionally, other types of network endpoints, such as mobile phone, personal digital assistant (PDA), etc.) may be used to locally or remotely connect to computing network 10. Similarly, different combinations of one or more back-end devices (policy control server 25, database server 30, etc.) may be provided. As such, the computing network 10 of FIG. 1 should not be construed to limit aspects presented herein.

A computing network, such as computing network 10, may be configured to operate as a trusted or secured network in order to limit access to the network and the network resources 40 to only authorized/authenticated users and network endpoints. In general, a secured network may include authentication mechanisms configured to verify the identity of each endpoint before the endpoint is allowed to be part of (i.e., connect to) the secured network. Additionally, a secured network may include authorization mechanisms configured to determine a level of access an endpoint requesting access to the network should be granted. This authorization may be based on the authenticated identity of the device and/or the identity of the user at the device. A secured network may also include an access control mechanism that operates on a per-packet basis to control the flow of packets in the network. The secured network may also include secure communication mechanisms configured to secure packets that flow over each link in the secured network. These secure communication mechanisms may include, for example, encryption, integrity, and data-path protection.

The authentication, authorization, access control, and secure communication mechanisms are collectively referred to herein as "security mechanisms." These security mechanisms may be implemented in a number of different ways that use a number of different network protocols. For example, different portions of the security mechanisms may be implemented using Security Group Access (SGA) policies, the Extensible Messaging and Presence Protocol (XMPP), Internet Protocol version 6 (IPv6), and Access Control Lists (ACLs), among others. For ease of illustration, the example of FIG. 1 will be primarily described with reference to the use of SGA policies. It is to be appreciated that this specific reference to the use of SGA policies is merely for purposes of illustration and that other examples may use any combination of the above or other security techniques.

Returning to the example of FIG. 1, the network endpoints 55(1), 55(2), 55(3), and 55(4) each comprise a connection client 80(1), 80(2), 80(3), and 80(4), respectively, that is a software program/application that may enable local or remote access to the computing network 10. The connection clients 80(1), 80(2), 80(3), and 80(4) are deployed to the network endpoints 55(1), 55(2), 55(3), and 55(4), respectively, via supplicant provisioning by the policy control server 25.

In operation, a user A, B, C, or D will log-in to the connection client 80(1), 80(2), 80(3), and 80(4) on the respective network endpoint 55(1), 55(2), 55(3), and 55(4) using some form of credentials. For authorized users A, B, and C, these credentials may be enterprise-issued usernames and passwords. The unauthorized user D may attempt to log-in to the connection client 80(4) using, for example, stolen or hacked username/password information. In certain examples, the security mechanisms of computing network 10 may recognize that user D is an unauthorized user and will prevent his/her from connecting to the network. However, for purposes of this description, it is assumed that in the example of FIG. 1 user D is able to successfully connect to the computing network.

After a successful log-in, the network endpoints 55(1), 55(2), 55(3), and 55(4) connect to the associated network attachment devices 20(1), 20(2), 20(3), and 20(4). The network attachment devices 20(1)-20(4) function as network admission points that may cooperate with policy control server 25 to authenticate the respective endpoint and user. Once authenticated, the network endpoints 55(1)-55(4) are each assigned an authorization policy tag (e.g., a security group tag (SGT), IPv6 packet flow tag, etc.). Additionally, when the network endpoints 55(1)-55(4) are authenticated, user and user group information for the respective users are collected (e.g., username, Active Directory (AD) groups, entitlement, etc.). Furthermore, the media access control (MAC) addresses of the network endpoints 55(1)-55(4) may be gathered (e.g., via calling-station-identifier in the authentication request), the Dynamic Host Configuration Protocol (DHCP) may convey the Internet Protocol (IP) address of the session, and instrumentation events may be collected and stored as an endpoint session record in the policy control server 25, binding the SGT, user, user group, IP information, authorization, and MAC address attributes together. Network access authentication may be performed in accordance with, for example, Institute of Electrical and Electronics Engineers (IEEE) 802.1X, the WebAuth protocol, etc.

The information obtained during the authentication operations is collectively and generally referred to herein as authentication information. This authentication information may be collected and stored individually for each session associated with a particular user or endpoint. The authentication information may also be stored as a historical authentication record that is associated with the particular user or network endpoint. For example, a historical authentication record may be maintained that includes the authentication information for every (or a selected number) of connections made by a particular user to the computing network 10.

The users A, B, C, or D may attempt to access one of the network resources 40 by transmitting a request in the direction of the network resources. Such a request, sometimes referred to herein as a service request, will include one or more packets directed to a specific resource. FIG. 1 first illustrates a first example where user A at desktop computer 55(1) attempts to access customer data 85 on data server 45(1). As such, a service request 90(1) is transmitted by desktop computer 55(1) towards the data server 45(1). The service request 90(1) will pass through the network attachment device 20(1) as well as any other in-path network devices, including firewall 35(1) and, possibly, other switches, routers, load balancers, etc., which have been omitted from FIG. 1 for simplicity.

The firewall 35(1) is a hardware network device or a software element on a network device that is configured to determine if user A at desktop computer 55(1) is authorized to access customer data 85. More specifically, the firewall 35(1) may perform ACL filtering by consulting one or more security group access control lists (SGACLs) that identify the access available to user A at desktop computer 55(1).

Turning to FIG. 2 (with continued reference to FIG. 1), a table 120 is shown that schematically illustrates an SGACL that may be used in one example of FIG. 1. As shown in table 120, employees located within the enterprise premises are granted full access to the customer data 85, application 46, and application 48. In the example of FIG. 1, user A is an employee and is located within the enterprise premises. As such, user A is authorized to access the customer 85 and the service request 90(1) passes through to data server 45(1) for processing. The data server 45(1) may then generate and transmit a response to the desktop computer 55(1) with the requested customer data. The location of user A may be determined based on a determined physical location of the device (i.e., desktop computer 55(1)) that transmitted the service request 90(1). For example, depending on the capabilities of the underlying hardware, global positioning system (GPS) or other mechanisms may be used to indicate location. In lieu of hardware location support, the geographic location can be approximated based on the point of network attachment.

FIG. 1 illustrates a second example where user C at tablet computer 55(3) attempts to access customer data 85 on data server 45(1). As such, a service request 90(2) is transmitted by tablet computer 55(3) towards the data server 45(1). The service request 90(2) will pass through the network attachment device 20(2), firewall 35(1), and any other in-path network devices. In this example, user C is an employee, but is not located within the enterprise premises. Instead, user C has connected to the network 10 while off premises (i.e., at a location that is not within the enterprise premises, such as a user's home, public locations, etc.). As such, as shown in table 120 of FIG. 2, user C at tablet computer 55(3) is not authorized to access the customer data 85 and the firewall 35(1) will block the service request 90(2). That is, the firewall 35(1) uses ACL filtering to examine and drop the packets in service request 90(2).

In conventional networks, when a packet is dropped as a result of some security mechanism (such as access control), the user at the network endpoint that transmitted the service request has no knowledge of why the packet was dropped and if any corrective action can be taken (or is being taken). For example, the user has no idea whether the packet was dropped because of authorization issues, because the destination resource was down, etc. In certain examples, a user may have access to network resources in certain circumstances, but will not have access to all of the network resources in other circumstances (i.e., where access depends on location, the network endpoint, the method of access, etc.). Simple packet drops in such circumstances may confuse the user and result in repeated attempts to access the resource. As such, presented herein is a mechanism to provide certain trusted users with an indication of a reason for the packet drop.

More specifically, as noted above in the example of FIG. 1 the user C does not have access to the customer data 85 while at his/her home and the service request 90(2) is blocked by firewall 35(1) (i.e., the packets in service request 90(2) are dropped). The firewall 35(1) is aware of the source IP address of the dropped packets, the destination IP address of the dropped packets, and the drop action. As such, packet drop information 110 (e.g., Netflow drop records) is collected by the policy control server 25 from the firewall 35(1).

After receiving the packet drop information 110, the policy control server 25 is configured to perform an analysis to determine if a summarized reason for blocking of the service request 90(2) by firewall 35(1) should be returned to the network endpoint 55(3). More specifically, the policy control server 25 is configured to correlate the dropped packets with the identity of user C and/or the tablet computer 55(3) that transmitted service request 90(2), sometimes referred to herein as the originating endpoint. In one example, the policy control server 25 uses historical authentication record(s) to match the source IP address of the dropped packets against the previously determined authorization information (e.g., user/user group/IP attributes) for user C and tablet computer 55(3).

The policy control server 25 is configured to use the received packet drop information 110 to determine a reason that firewall 35(1) blocked the service request 90(2). The policy control server 25 is also configured to evaluate the received packet drop information 110 and/or previously determined authorization information to determine if the user C is a trusted entity or user. That is, a return policy decision is made to only return the reason for the packet drop (i.e., blockage of service request 90(2)) if the user C has an identity that is verifiable by the policy control server 25. The user C may have a verifiable identity when, for example, the user C is recognized to be an employee of the enterprise or a member of a particular group recognized by the enterprise. A return policy decision may also be made to only return the reason for the drop if the historical authentication record shows that the user C previously had a higher access level, but is currently reduced to a lower authorization level because of a situation such as location, posture, time of day, etc.

The policy control server 25 may use database server 30 to implement the policy return decision. In one example, the database server 30 includes an employee directory 82 that is accessed by the policy control server 25 to execute the return policy decision (i.e., to determine if the user is an employee, the user's department, access type, etc.). The policy control server 25 may access the employee directory 82 using, for example, a Lightweight Directory Access Protocol (LDAP). LDAP is an application protocol for querying and modifying items in directory service providers, such as Active Directory.

Additionally, the reason for the packet drops is correlated from the packet drop at the data plane to the security tag (e.g., SGT) authorization at the control plane. The security tag assignment may be back-traced to the reason/factor that contribute to the assignment. If the user was previously entitled to a higher level of authorization, the difference between the current and previous authorization levels may be identified to assist in remediation.

If the policy control server 25 determines that user C is a trusted user, the policy control server 25 then transmits a notification to tablet computer 55(3) that includes the summarized reason for the packet drops. This notification is shown in FIG. 1 by arrow 115. However, if policy control server 25 determines that user C is not a trusted user, then no notification would be transmitted to tablet computer 55(3). Additionally, the policy control server 25 may be configured to trigger an alert or notification to a network administrator indicating that a non-trusted user has attempted to access the customer data 85.

The notification 115 is used at tablet computer 55(3) to convey to the user C why the packets in service request 90(2) were dropped. In this case, the user C was denied access to the customer data 85 because the user C was working from home. As noted above and as shown in table 150, customer data 85 is inaccessible to employees while outside the enterprise. As such, connection client 80(3), deployed on the tablet computer 80(3), is used to present a message to the user C, independent of the application or protocol that the user C is using that experienced the drop, the message summarizing the reason that service request 90(2) was blocked (i.e., consistent access denial message that transcends application boundaries). The connection client 80(3) may generate an audible, text, or other message to user C stating: "Your access to customer data is denied since you are not in the office," "Employee access to customer data is blocked when outside the office," etc. If it is an untrusted identity, this information will not be conveyed.

The connection clients 80(1)-80(4) are connection oriented transports that support server side notifications (e.g., XMPP). In operation, the connection clients 80(1)-80(4) establish an XMPP connection with the policy control server 25, authenticating with certificate authentication, and registering the MAC address of the endpoint to the server. The policy control server 25 tracks the MAC address of the network endpoints associated with the connection clients 80(1)-80(4).

In one example, to send the notification 115 when a packet drop has occurred, the policy control server 25 finds the connection client 80(3) responsible for the endpoint MAC address from its endpoint session records. The policy control server 25 then sends an XMPP message to the connection client 80(3). The connection client 80(3) presents the message to the user C.

Additionally, the notification 115 may be generated by the policy control server 25 so as to convey other information, such as remediation information, to the user C. This remediation information may include, for example, instructions for removing non-compliant application/files, changing locations, establishing a connection through a different network (e.g., a more secure network), etc. In general, the remediation information may be configured to assist the user in fulfilling the compliance policy in order to gain access to the requested resources.

The service request 90(2) may include a plurality of packets that are each dropped by the firewall 35(1) when the service request is blocked. As such, the policy control server 25 is configured to execute a thresholding mechanism that eliminates duplicate notifications and prevents a notification from being transmitted with the dropping of each packet in the service request 90(2). In one example, duplicate suppression may be performed based on a timer (e.g., so as not to generate a new notification if the last occurrence of the event was within 30 minutes). In one such example, each new event having the same packet drop reason may advance the timer and restart the duplicate suppression waiting period.

Figure 3B:
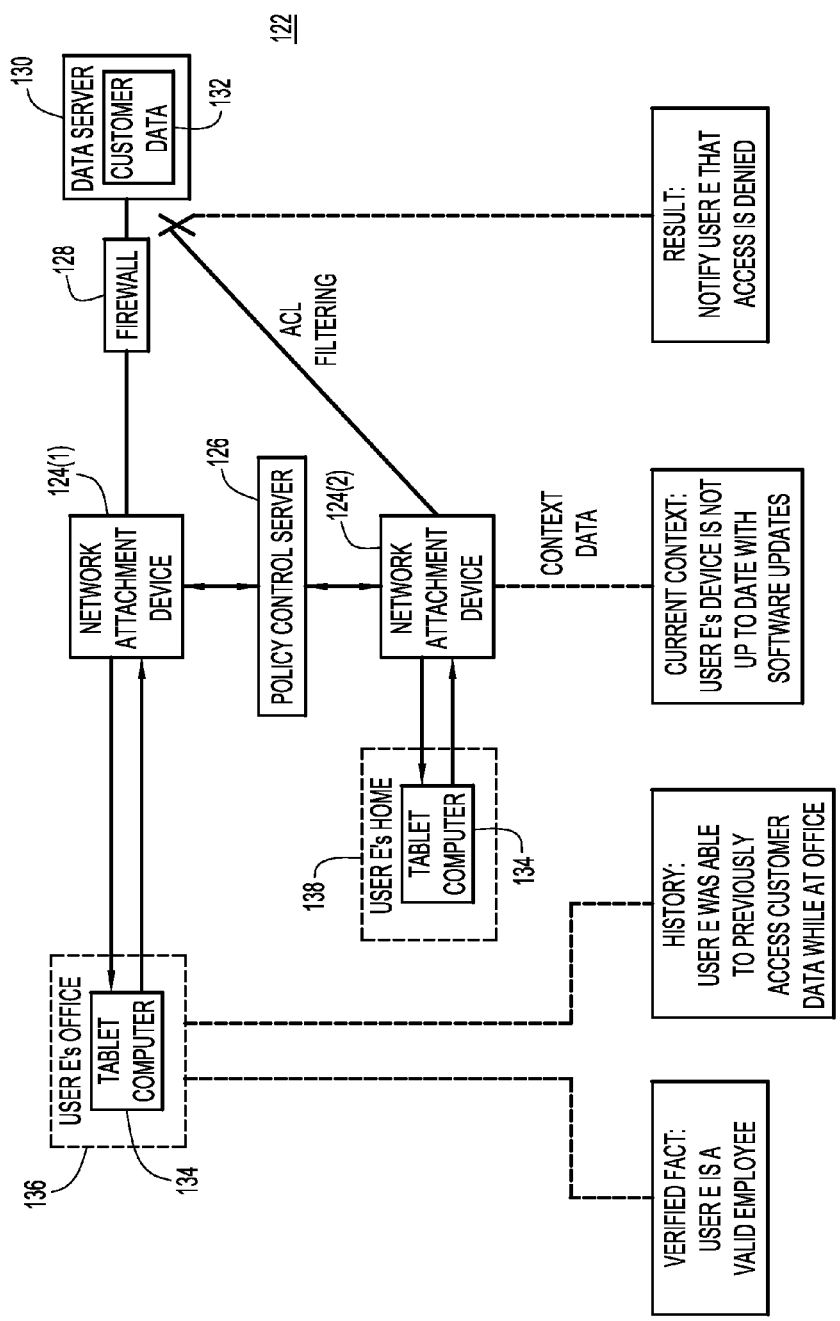
Figure 3C:
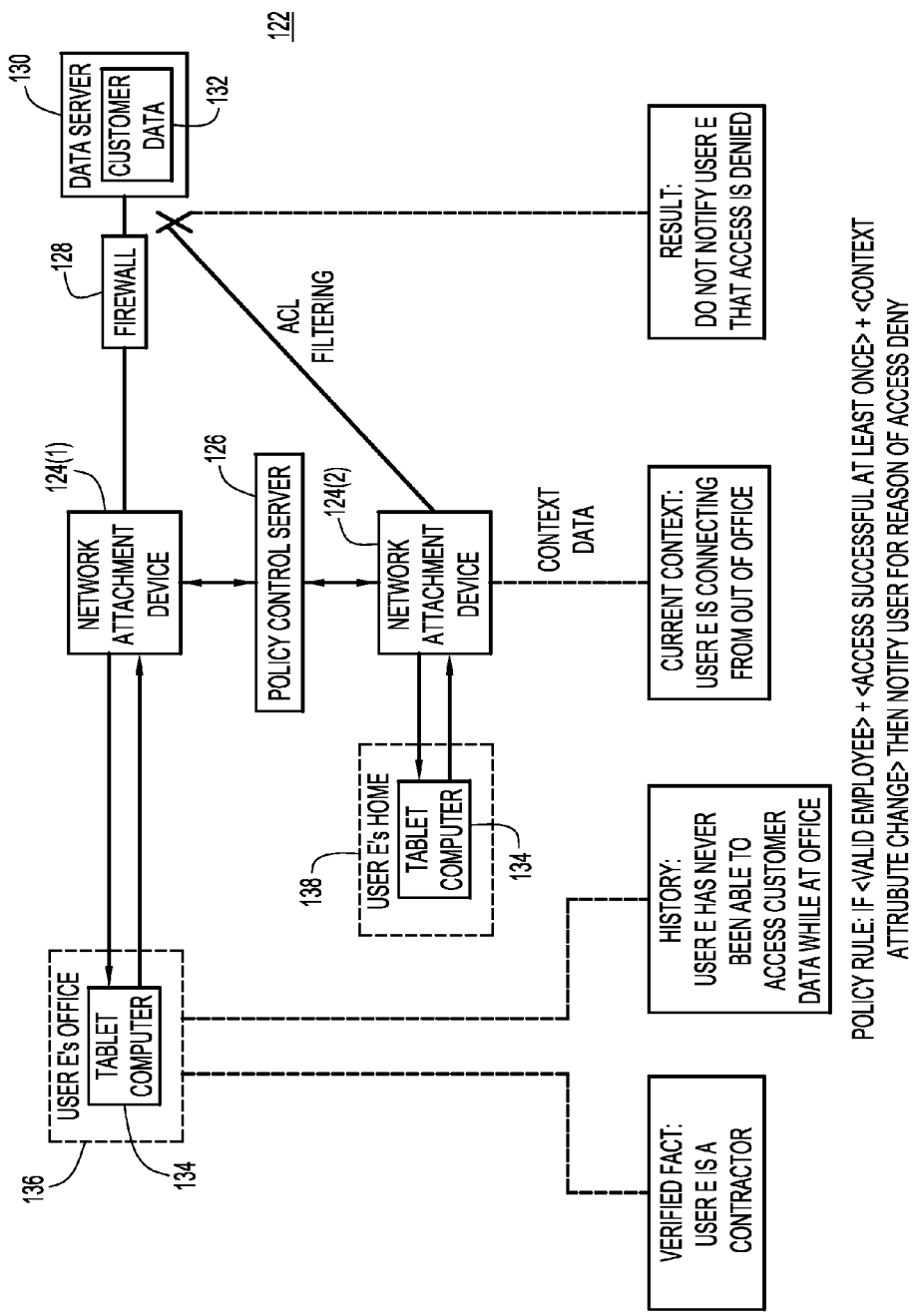

It is to be appreciated that various return policy decisions may be executed based on number of different policy rules. Reference is now made to FIGS. 3A-3C, which are schematic diagrams illustrating the application of return policy decisions based on one specific policy rule. More particularly, FIGS. 3A-3C are simplified schematic diagrams of a computing network 122 that may be similar to computing network 10 of FIG. 1. As shown, computing network 122 comprises first and second network attachment devices 124(1) and 124(2), a policy control server 126, a firewall 128, and a data server 130 that includes customer data 132. In these examples, a user (user E) is associated with a tablet computer 134. User E attempts to access customer data 132 from tablet computer 134 while in his/her office 136. Subsequently, the user E attempts to access customer data 132 from tablet computer 134 while in his/her home 138.

In each of FIGS. 3A, 3B, and 3C, the attempt by user E to access the customer data 132 from his/her home 138 is blocked. Policy control server 126 is configured to execute a return policy decision based on an example policy rule where a notification may be generated only if: (1) the user at the requesting network endpoint is an employee, (2) the employee has previously successfully accessed the requested network resource, and (3) a context attribute change has been detected that prevents access to the network resources (i.e., a change in location or device has been detected). That is, if these three conditions are met, then the user at the requesting network endpoint is provided with a notification summarizing the reason that an underlying service request was blocked.

In the example of FIG. 3A, it is determined that: (1) user E is a valid employee (i.e., verifiable identity), (2) user E was previously able to access the customer data while at the office (e.g., determined based on a historical record), and (3) user E is connecting from out of the office (i.e., the user E has changed locations so as to change a context attribute that prevents access to the customer data 132). As such, all three portions/factors of the example policy rule are met and the policy control server 126 generates a notification to tablet computer 134 summarizing the reason that access to customer data 132 has been blocked. In this example, the user E is notified that he/she cannot access the customer data 132 while out of the office.

In the example of FIG. 3B, it is determined that: (1) user E is a valid employee (i.e., verifiable identity), (2) user E was previously able to access the customer data while at the office (e.g., determined based on a historical record), and (3) at the time of the second access from home, the software on user E's tablet computer 134 is not up to date (i.e., the lack of software updates is a change in a context attribute that prevents access to the customer data 132). As such, all three portions/factors of the example policy rule are met and the policy control server 126 generates a notification to tablet computer 134 summarizing the reason that access to customer data 132 has been blocked. In this example, the user E is notified that he/she cannot access the customer data 132 because the software on user E's device is not up to date.

In the example of FIG. 3C, it is determined that: (1) the user E is a contractor (i.e., verifiable identity), (2) user E was never been able to access the customer data while at the office (e.g., determined based on a historical record), and (3) that the user E is connecting from out of the office. In this case, all three portions/factors of the example policy rule are not met (the contractor was not previously able to access the customer data 132) and the policy control server 126 does not generate a notification to tablet computer 134 summarizing the reason that access to customer data 132 has been blocked.

Figure 4:
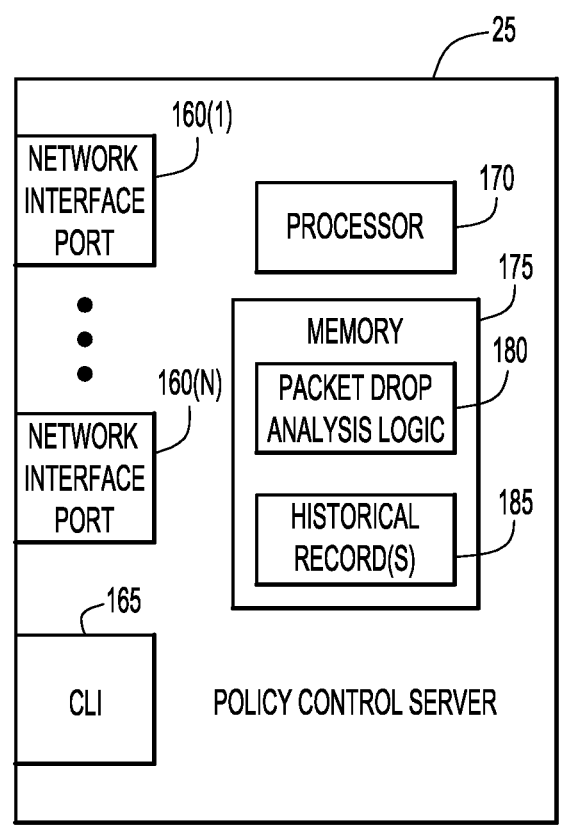
FIG. 4 is a block diagram of a policy control server in accordance with examples presented herein.

FIG. 4 is a block diagram of a policy control server 25 configured to operate in accordance with examples presented herein. As shown, policy control server 25 comprises a plurality of network interface ports 160(1)-160(N), a command-line interface (CLI) 165, a processor 170, and a memory 175 comprising packet drop analysis logic 180 and one or more historical record(s) 185.

The network interface ports 160(1)-160(N) provide network communications between the policy control server 25 and one or more of the network attachment devices 20(1)-20(4), database server 30, firewalls 35(1) and 35(2), and other network components. Network interface ports 160(1)-160(N) may be, for example, Ethernet ports of a network interface card (NIC) implemented in one or more application-specific integrated circuits (ASICs). The CLI 165 is a mechanism by which commands can be delivered to the policy control server 25 in the form of successive lines of text (command lines). As such, the CLI 165 may be used by the network administrator to establish/configure network policies as described above. It should be appreciated that use of the CLI 165 is merely an example and that other mechanisms may also or alternatively be provided for a network administrator to use in configuring network policies on the policy control server 25. Historical record(s) 185 are, in general, records of stored authentication information for particular users or network endpoints. For example, a historical record 185 may be maintained that includes the authentication information for every connection or a selected number of connections made by a particular user to a computing network.

Memory 175 may comprise read only memory (ROM), random access memory (RAM), magnetic disk storage media devices, optical storage media devices, flash memory devices, electrical, optical, or other physical/tangible memory storage devices. The processor 170 is, for example, a microprocessor or microcontroller that executes instructions for the packet drop analysis logic 180. Thus, in general, the memory 175 may comprise one or more tangible (non-transitory) computer readable storage media (e.g., a memory device) encoded with software comprising computer executable instructions and when the software is executed (by the processor 170) it is operable to perform the operations described herein in connection with packet drop analysis logic 180 and, in general, the operations of policy control server to determine if a summarized reason for blocking of a service request 90(2) should be returned to an originating network endpoint (i.e., the endpoint that originated the blocked service request).

More specifically, when executed, the packet drop analysis logic 180 may be configured to correlate dropped packets with the identity of the user C and/or the network endpoint that transmitted the blocked service request. The packet drop analysis logic 180 may also be executable to determine a reason that the service request was blocked and to evaluate received packet drop information and/or previously determined authorization information to determine if a user at the originating endpoint is a trusted entity or user. That is, packet drop analysis logic 180 is executable to perform a return policy decision to only return the reason for the packet drop if the user C at the originating endpoint is a trusted user. If the user is a trusted user, the packet drop analysis logic 180 may then be executed to transmit a notification to the originating endpoint that includes the summarized reason for the packet drops.

Figure 5:
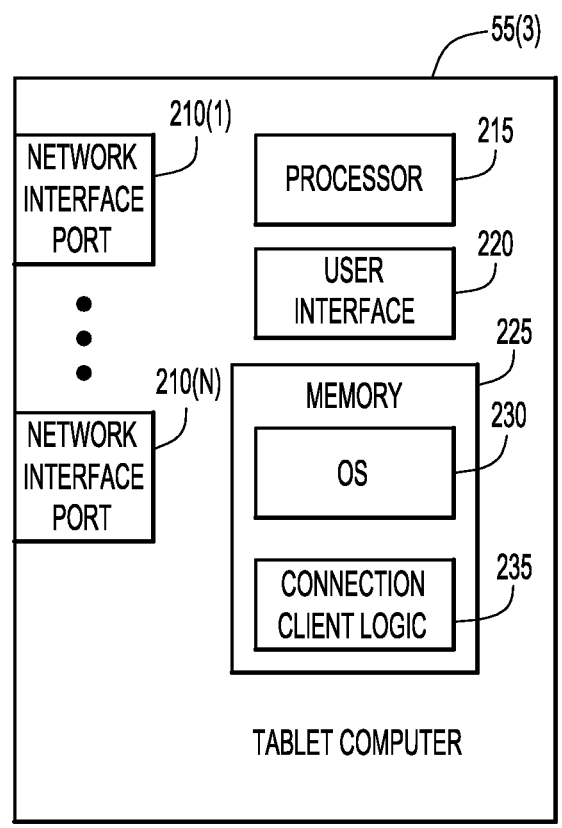
FIG. 5 is a block diagram of a network endpoint in accordance with examples presented herein.

FIG. 5 is a block diagram illustrating further details of an example network endpoint that may be a computer (desktop, laptop, table etc.) or a mobile device (phone, etc.) that is used to connect to an enterprise computing network. For ease of illustration, the examples of FIG. 5 will be described with reference to one type of network endpoint, namely tablet computer 55(3) of FIG. 1. As shown, tablet computer 55(3)) comprises a plurality of network interfaces 210(1)-210(N). These network interfaces 210(1)-210(N) may be, for example, wireless interfaces, such as WiFi™ wireless local area network interfaces, 3G interfaces, Bluetooth interfaces, as well as wired network interfaces, etc. Tablet computer 55(3) further comprises a processor 215, a user interface 220, and a memory 225. Memory 225 comprises an operating system (OS) 230 and connection client logic 235. User interface 220 may take many different forms and may include, for example, a keypad, keyboard, mouse, touchscreen, display screen, etc.

Memory 225 may comprise ROM, RAM, magnetic disk storage media devices, optical storage media devices, flash memory devices, electrical, optical, or other physical/tangible memory storage devices. The processor 215 is, for example, a microprocessor or microcontroller that executes instructions for the OS 230 and the connection client logic 235. Thus, in general, the memory 225 may comprise one or more tangible computer readable storage media (e.g., a memory device) encoded with software comprising computer executable instructions and when the software is executed (by the processor 215) it is operable to perform the operations described herein in connection with connection client 80(3). That is, the connection client logic 235 may be executed to perform the above described operations of connection client 80(3).

FIGS. 4 and 5 illustrate a software implementation of packet drop analysis logic 180 and connection client logic 235. It is to be appreciated that these software implementations of FIGS. 4 and 5 are merely illustrative and that other implementations are possible. For example, in an alternative arrangement, packet drop analysis logic 180 and connection client logic 235 may be implemented fully or partially as hardware elements, such as digital logic gates in one or more ASICS.

Figure 6:
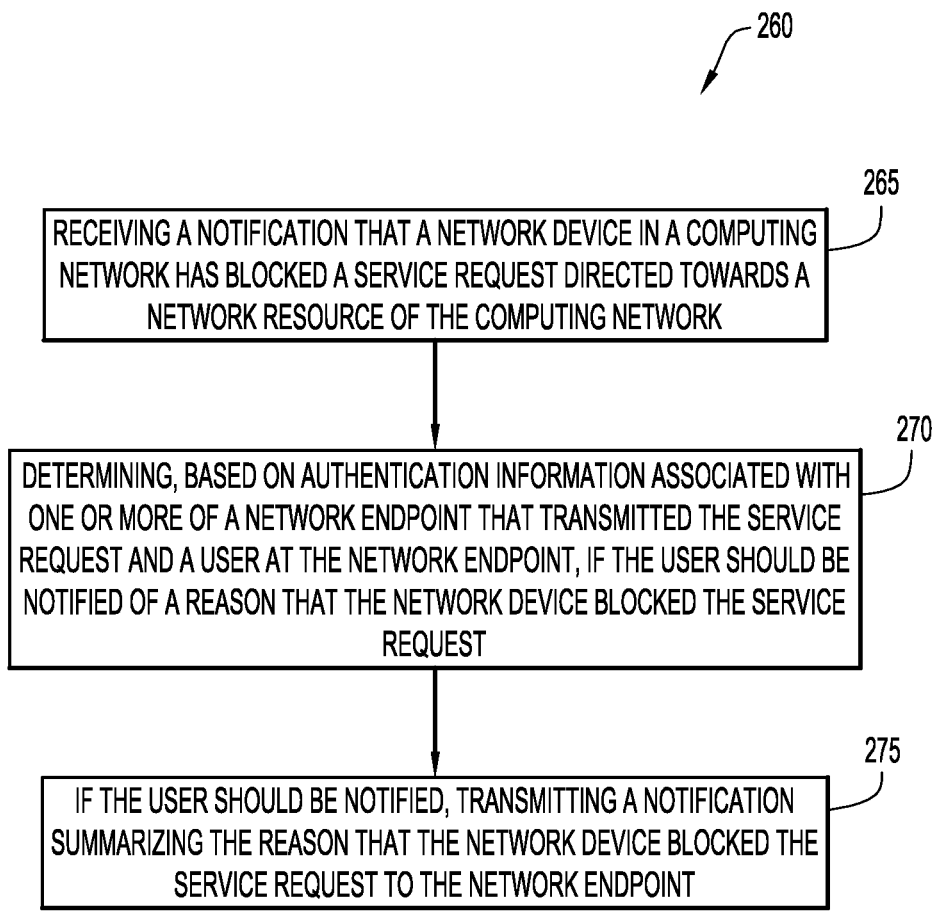
FIG. 6 is a high-level flowchart of a method in accordance with examples presented herein.

FIG. 6 is a high-level flowchart of a method 260 in accordance with the techniques presented herein. Method 260 begins at 265 wherein a notification is received that a network device in a computing network has blocked a service request directed towards a network resource of the computing network. At 270, authentication information associated with one or more of a network endpoint that transmitted the service request and a user at the network endpoint is used to determine if the user should be notified of a reason that the network device blocked the service request. At 275, if it is determined that the user should be notified, then a notification summarizing the reason that the network device blocked the service request is transmitted to the network endpoint.

In general, techniques are presented herein to back trace and convey the reason for a security packet drop to the end user as needed and appropriate, based on user policy and historical context of the user. That is, policy and historical data are used to determine if disclosing the reason for a security packet drop is appropriate. Communicating the reason for the security packet drop may improve user experience and allow for employee self-remediation in situation where reconnaissance is not a concern, thereby reducing the number of support calls.

The above description is intended by way of example only.

What is claimed is:

1. A method comprising:
   receiving, at a server, a notification from a network device in a computing network indicating that the network device has blocked a service request directed towards a network resource of the computing network;
   determining, at the server based on the received notification, a reason that the network device blocked the service request;
   following receipt of the notification indicating that the network device has blocked the service request, performing an analysis at the server of authentication information associated with a network endpoint that transmitted the service request and a user at the network endpoint, to determine whether to block a notification to the network endpoint that summarizes a reason that the network device blocked the service request; and
   based on the results of the analysis, blocking transmission of the notification from the server to the network endpoint that summarizes the reason that the network device blocked the service request.

2. The method of claim 1, wherein performing the analysis to determine whether to block the notification to the network endpoint that summarizes a reason that the network device blocked the service request comprises:
   determining if the user has a verifiable identity.

3. The method of claim 2, wherein determining if the user has a verifiable identity comprises:
   accessing a user directory to determine if the user's identity is recognized within the directory.

4. The method of claim 1, wherein performing the analysis to determine whether to block the notification to the network endpoint that summarizes a reason that the network device blocked the service request comprises:
   determining if the user previously had a higher access level, but is currently reduced to a lower access level.

5. The method of claim 1, further comprising:
   following receipt of a second notification indicating that the network device has blocked a second service request, performing an analysis of authentication information associated with a second network endpoint that transmitted the second service request and a user at the second network endpoint, to determine whether to block a notification to the second network endpoint that summarizes a reason that the network device blocked the service request; and
   based on the results of the analysis, transmitting the notification from the server to the second network endpoint that summarizes the reason that the network device blocked the second service request, wherein the notification includes remediation information configured to assist the user at the second network endpoint in gaining access to the network resource.

6. The method of claim 5, wherein the second service request includes a plurality of packets that will each be dropped by the network device, and further comprising:
executing a thresholding mechanism to prevent notifications from being transmitted to the second network endpoint with the dropping of each packet in the second service request.

7. The method of claim 5, further comprising:
at the second network endpoint, generating a message to the user that is independent of the application or protocol that the user is using, the message summarizing the reason the second service request was blocked.

8. An apparatus comprising:
one or more network interface ports to enable network communications;
a memory; and
a processor coupled to the one or more network interface ports and the memory, the processor to:
receive a notification from a network device in a computing network indicating that the network device has blocked a service request directed towards a network resource of the computing network;
determine, based on the received notification, a reason that the network device blocked the service request;
following receipt of the notification indicating that the network device has blocked the service request, perform an analysis of authentication information associated with a network endpoint that transmitted the service request and a user at the network endpoint, to determine whether to block a notification to the network endpoint that summarizes a reason that the network device blocked the service request; and
based on the results of the analysis, block transmission of the notification to the network endpoint that summarizes the reason that the network device blocked the service request.

9. The apparatus of claim 8, wherein to perform the analysis to determine whether to block the notification to the network endpoint that summarizes a reason that the network device blocked the service request the processor:
determines if the user has a verifiable identity.

10. The apparatus of claim 9, wherein to determine if the user has a verifiable identity the processor:
accesses a user directory to determine if the user's identity is recognized within the directory.

11. The apparatus of claim 8, wherein to perform the analysis to determine whether to block the notification to the network endpoint that summarizes a reason that the network device blocked the service request the processor:
determines if the user previously had a higher access level, but is currently reduced to a lower access level.

12. The apparatus of claim 8, wherein the processor:
following receipt of a second notification indicating that the network device has blocked a second service request, performs an analysis of authentication information associated with a second network endpoint that transmitted the second service request and a user at the second network endpoint, to determine whether to block a notification to the second network endpoint that summarizes a reason that the network device blocked the service request; and
based on the results of the analysis, cause the notification to be transmitted to the second network endpoint that summarizes the reason that the network device blocked the second service request, wherein the notification includes remediation information configured to assist the user at the second network endpoint in gaining access to the network resource.

13. The apparatus of claim 12, wherein the second service request includes a plurality of packets that will each be dropped by the network device, and wherein the processor:
executes a thresholding mechanism to prevent notifications from being transmitted to the second network endpoint with the dropping of each packet in the second service request.

14. The apparatus of claim 12, wherein to transmit a notification summarizing the reason that the network device blocked the second service request to the second network endpoint the processor:
causes transmission of a notification that enables the second network endpoint to generate a message to the user that is independent of the application or protocol that the user is using and that summarizes the reason the second service request was blocked.

15. One or more non-transitory computer readable storage media encoded with software comprising computer executable instructions and when the software is executed operable to:
receive a notification from a network device in a computing network indicating that the network device has blocked a service request directed towards a network resource of the computing network;
determine, based on the received notification, a reason that the network device blocked the service request;
following receipt of the notification indicating that the network device has blocked the service request, perform an analysis of authentication information associated with a network endpoint that transmitted the service request and a user at the network endpoint, to determine whether to block a notification to the network endpoint that summarizes a reason that the network device blocked the service request; and
based on the results of the analysis, block transmission of the notification from the server to the network endpoint that summarizes the reason that the network device blocked the service request.

16. The non-transitory computer readable storage media of claim 15, wherein the instructions operable to perform the analysis to determine whether to block the notification to the network endpoint that summarizes a reason that the network device blocked the service request comprise instructions operable to:
determine if the user has a verifiable identity.

17. The non-transitory computer readable storage media of claim 16, wherein the instructions operable to determine if the user has a verifiable identity comprise instructions operable to:
access a user directory to determine if the user's identity is recognized within the directory.

18. The non-transitory computer readable storage media of claim 15, wherein the instructions operable to perform the analysis to determine whether to block the notification to the network endpoint that summarizes a reason that the network device blocked the service request comprise instructions operable to:
determine if the user previously had a higher access level, but is currently reduced to a lower access level.

19. The non-transitory computer readable storage media of claim 15, further comprising instructions operable to:
following receipt of a second notification indicating that the network device has blocked a second service request, perform an analysis of authentication information associated with a second network endpoint that transmitted the second service request and a user at the second network endpoint, to determine whether to block a notification to the second network endpoint that summarizes a reason that the network device blocked the service request; and based on the results of the analysis, transmit the notification to the second network endpoint that summarizes the reason that the network device blocked the second service request, wherein the notification includes remediation information configured to assist the user at the second network endpoint in gaining access to the network resource.

20. The non-transitory computer readable storage media of claim 19, wherein the second service request includes a plurality of packets that will each be dropped by the network device, and comprising instructions operable to:

execute a thresholding mechanism to prevent notifications from being transmitted to the second network endpoint with the dropping of each packet in the second service request.

21. The non-transitory computer readable storage media of claim 19, wherein the instructions operable to transmit a notification summarizing the reason that the network device blocked the second service request to the network endpoint comprise instructions operable to:

transmit a notification that enables the second network endpoint to generate a message to the user that is independent of the application or protocol that the user at the second network endpoint is using and that summarizes the reason the request was blocked.

\* \* \* \* \*